United States Patent [19]

Schunck et al.

[11] Patent Number: 4,633,938

[45] Date of Patent: Jan. 6, 1987

[54] GEAR DRIVE COOLING SYSTEM

[75] Inventors: Richard A. Schunck, New Berlin; Richard W. Holzman, Waukesha, both of Wis.

[73] Assignee: The Falk Corporation, Milwaukee, Wis.

[21] Appl. No.: 763,647

[22] Filed: Aug. 8, 1985

[51] Int. Cl.⁴ .................... F16H 57/04; F01M 5/00; F01P 11/08; F16N 39/02

[52] U.S. Cl. ........................... 165/47; 165/76; 184/104.1; 74/467; 74/606 A; 285/13; 285/158

[58] Field of Search ............. 165/47, 76; 184/104.1, 184/104.2, 104.3, 6.22, 6.12; 74/606 A, 467; 123/196 AB; 285/13, 14, 158, 351

[56] References Cited

U.S. PATENT DOCUMENTS

| | | | |
|---|---|---|---|
| 1,192,253 | 7/1916 | Wood | 184/104.1 |
| 1,639,680 | 8/1927 | Acker | 184/104.1 |
| 1,740,120 | 12/1929 | Schmidt | 184/104.1 |
| 1,942,101 | 1/1934 | Howarth | 184/104.1 |
| 2,487,215 | 11/1949 | Blatt | 184/104.3 |
| 2,537,678 | 1/1951 | Koetting | 165/76 |
| 2,687,784 | 8/1984 | Klackner | 184/104.1 |
| 2,698,773 | 1/1955 | Kaczor | 184/104.1 |
| 2,816,739 | 12/1957 | Stoehr | 165/76 |
| 3,489,435 | 1/1970 | Weber et al. | 285/13 |
| 3,736,812 | 6/1973 | Wellauer | 184/104.1 |
| 3,736,812 | 6/1973 | Wellauer | 74/606 A |
| 4,414,861 | 11/1983 | Witt | 184/6.22 |
| 4,414,861 | 10/1983 | Witt | 74/606 A |
| 4,445,713 | 5/1984 | Bruning | 285/158 |

FOREIGN PATENT DOCUMENTS

| | | | |
|---|---|---|---|
| 2134307 | 8/1972 | France | 165/76 |
| 0497968 | 9/1954 | Italy | 123/196 AB |
| 0112457 | 8/1980 | Japan | 74/467 |
| 0344702 | 3/1931 | United Kingdom | 184/104.1 |
| 1406298 | 9/1975 | United Kingdom | 184/104.1 |

OTHER PUBLICATIONS

Photograph EG-52141—Undated.
Form 520701 "Fin Type Cooler"—Undated.
Catalog Pages of the Lenz Company, pp. 1, A, B, C and D—Undated.

*Primary Examiner*—William R. Cline
*Assistant Examiner*—John K. Ford
*Attorney, Agent, or Firm*—Quarles & Brady

[57] ABSTRACT

A gear drive has an enclosed housing that acts as a lubricant reservoir. Hollow, finned heat exchanger tubes are mounted in the housing at a level where they are submerged beneath the surface of the pool of lubricant in the housing. The tubes extend outward of the housing and connections are made external of the housing between the tubes and a source of a cooling liquid, such as water, and a drain.

3 Claims, 4 Drawing Figures

GEAR DRIVE COOLING SYSTEM

BACKGROUND OF THE INVENTION

This invention relates to gear drives and particularly to an improved system for cooling a gear drive during operation.

The meshing gearing of a gear drive unit under load generates vast quantities of heat. Without some mechanism or system for removing the heat, the oil lubricant for the gearing may reach a temperature between 250 and 300 degrees F. At such temperature levels, the lubricant thins and oxidizes thereby destroying its ability to provide the necessary film between the contacting metal surfaces. Long exposure to high temperatures will also destroy the heat treatment of the gears and bearings, thereby reducing their hardness and leading to failures. A maximum oil bath temperature of 200 degrees F. is the design goal, and to achieve this it is necessary to provide a system for cooling the interior of the gear drive.

A variety of cooling systems have been proposed and used. A simple system mounts a fan on one or more of the shafts of the gearing to circulate air over the exterior of the gear drive housing. A more elaborate version splashes the oil bath against an impeller that mounts a fan external of the housing, with the impeller being surrounded by a series of hollow tubes that allow air to circulate through the housing under the influence of the fan. This later system is described in U.S. Pat. No. 4,414,861 issued Nov. 15, 1983 to Witt for "Gear Drive Cooling". Another approach is shown in U.S. Pat. No. 3,736,812 issued June 5, 1973 to Wellauer for "Speed Reducer Recirculating Cooling System". That system uses a fan to draw warm air from the interior of the housing, pass the air through a circulating water heat exchanger, and return the cooled air to the interior of the housing. Still another system inserts a bank of finned tubes into the top of the housing where they are exposed to the air and to lubricant that is splashed from the gearing. Cool water is circulated through the tubes to cool the air and the oil that is splashed against the tube.

All of the above systems cool the air in the drive housing, or the air and splashed oil, in an attempt to lower the operating temperature. The cooling system of this invention acts directly on the oil lubricant by exchanging heat between the oil and water circulating through heat exchangers that are submerged in the reservoir of oil in the base of the gear drive housing.

SUMMARY OF THE INVENTION

The invention provides a cooling system for a gear drive in which hollow heat exchanger tubes are disposed in the gear drive housing beneath the surface level of the pool of lubricant in the housing, with connections for the tubes to a source of cooling liquid.

In the preferred embodiment, the tubes extend entirely through the housing from end to end and are connected to each other exterior of the housing. The tubes are each formed from a straight pipe surrounded by fins. The housing has aligned openings of a size that allows the insertion of the tubes from the exterior of the housing. The projecting ends of the pipe pass through bushings that are mounted in and close the openings in the housing.

It is a principal object of the invention to provide a system for directly cooling the lubricant bath of a gear drive.

It is another object of the invention to provide such a cooling system that can be assembled from the exterior of the gear drive housing to thereby allow simplified service and maintenance if necessary.

It is also an object of the invention to provide such a cooling system in which all fittings are external of the gear drive housing and are replaceable.

It is also an object of the invention to provide a water cooling system for the oil bath of a gear drive in which all connections that might be a source of leakage are external of the gear drive housing.

The foregoing and other objects and advantages of the invention are set forth in the following detailed description. In the description, reference is made to the accompanying drawing which shows the preferred embodiments of the invention.

DETAILED DESCRIPTION OF THE PREFERRED EMBODIMENTS

Figure 1:
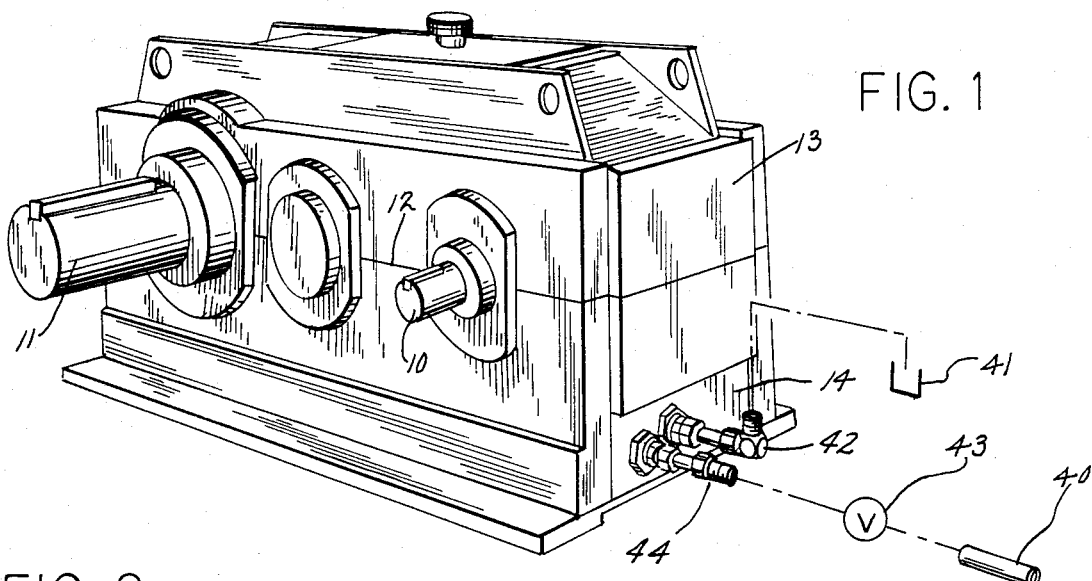
FIG. 1 is a view in perspective of a gear drive including the cooling system of the present invention.
Figure 2:
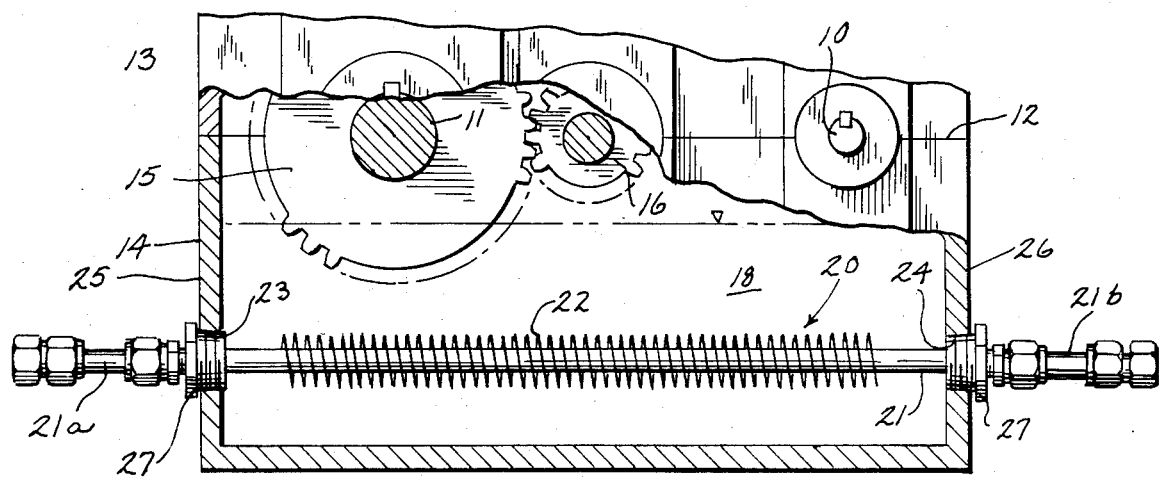
FIG. 2 is a view in vertical section through the lower portion of the gear drive of FIG. 1.

FIG. 1 shows a parallel shaft speed reducer in which the high speed input shaft 10 and the low speed output shaft 11, together with intermediate shafts, are located at a parting line 12 that separates an upper housing 13 from a lower housing 14. The upper and lower housings 13 and 14 together provide a complete enclosure for the meshing gearing that joins the shafts 10 and 11. The gearing is represented generally by the output gear 15 and intermediate gear 16 shown in FIG. 2.

The lower housing 14 acts as a reservoir for a pool 18 of oil lubricant. A plurality of heat exchanger tubes 20 are mounted in the lower housing 14 well below the surface level of the lubricant. Each tube 20 is formed of a straight pipe 21 that has fins 22 wound about the surface. The ends 21a and 21b of the pipe 21 extend outside of the housing 14 through aligned openings 23 and 24 in opposite walls housing 25 and 26, respectively. The openings 23 and 24 are threaded and receive threaded pipe bushings 27. A suitable sealing compound seals the threads. The openings 23 and 24 are of a size that allows the tubes 20 with the fins 22 to be inserted into the housing 14 from the exterior.

The tubes 20 may be formed with a nickel-copper pipe with aluminum spiral fins swaged in place about the pipe. Alternatively the tubes 20 can be copper, nickel, stainless steel and mild steel, and the fins can be aluminum or any other thermally conductive material.

Figure 3:
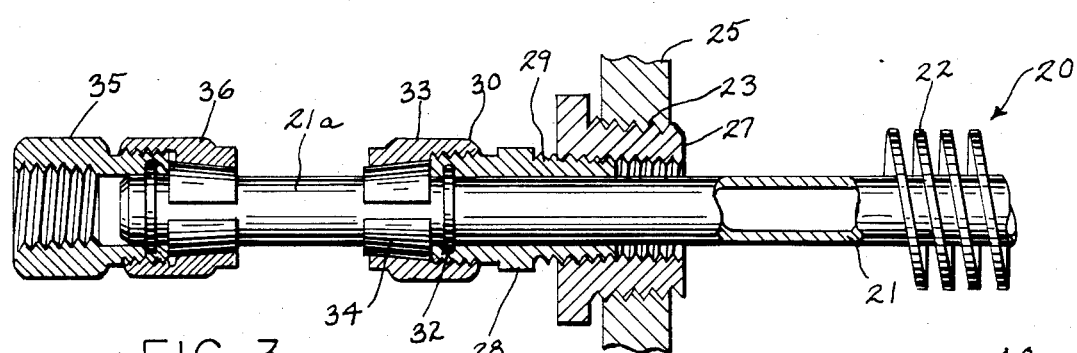
FIG. 3 is a view in section to an enlarged scale of the fittings and connections for the heat exchange tubes.

A fitting body 28 has two externally threaded ends 29 and 30. One end 29 is received in a threaded counterbore 31 of the pipe bushing 27. The other end 30 mounts an O-ring 32 and is engaged by a nut 33 that has an inner tapered surface cooperating with a tapered split ring 34. As shown in FIG. 3, each projecting pipe end 21a or 21b extends through a bushing 27, a fitting body 28, and a nut 33, and is surrounded by an O-ring 32 and a split ring 34. The O-ring seals the pipe and the split ring grips the pipe. Therefore, when the body 28 and nut 33 are assembled to each other and to the bushing 27, the tube 20 is secured in place in the housing 14, the openings 23 and 24 are sealed, and the lubricant is prevented from leaking out along the pipe 21 by the O-ring.

The fitting body 28 and nut 30, with the O-ring 32 and split ring 34, comprise a commercially available tube fitting. A similar fitting with a body 35 and nut 36 grips the extreme end of the pipe 21. The body 35 is internally threaded to accept additional fittings and connections to join adjacent tubes together, as shown for example in FIG. 4, to thereby form a connected network of tubes 20, and to connect one end of the network to a source 40 of water under pressure and the other end of the network to a drain 41. The end connected to the drain 41 has an upright elbow fitting 42 so that a head of water will be provided at all times. A flow control valve 43 may interposed between the source 40 and the inlet fitting 44.

Figure 4:
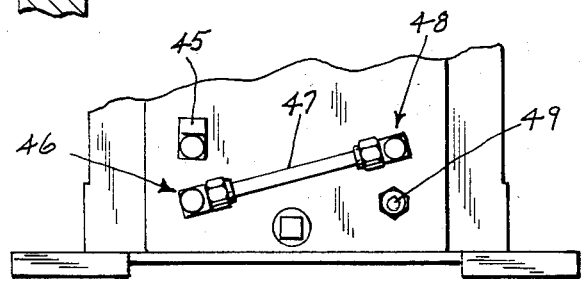
FIG. 4 is a partial view in elevation of the tube connections of an alternate embodiment of the invention.

Any number of tubes 20 can be used, depending upon the cooling requirements of the particular size of gear drive and the environment in which it will operate. In the embodiment of FIG. 1, only two tubes 20 are used, while in the embodiment of FIG. 4, four tubes 20 are used. In FIG. 4, the tubes are arranged in two banks with the water outlet 45 connected to the upper tube of one bank that is connected to a lower tube 46. The lower tube 46 is joined by a cross pipe 47 to the upper tube 48 of the second bank. The upper tube 48 connects to the lower tube which contains the water inlet 49.

Although the preferred embodiment is illustrated as using a particular form of tube fitting that includes an O-ring and a tapered split ring, there are other commercially available tube fittings that could also be used, including those that use compression sleeves, ferrules, or clamps. Some of such available fittings do not require threaded connections. However, all such fittings are mounted external to the gear drive housing and are easily replaceable if required by erosion or other wear, or if the connections to source and drain need to be repiped.

In operation, the water is circulated through the network of heat exchanger tubes 20 from the source to drain. Normal supply line pressure is sufficient, and the flow control valve is set to maintain a flow of between 2 and 5 gallons per minute. The lower limit of flow is selected to prevent fouling and the upper limit is set to prevent erosion of the pipes 21. The cool water passing through the tubes will cool the pool of lubricant.

Because the tubes 20 are always submerged in the lubricant, water cannot condense on the tubes as it might if the heat exchanger tubes were exposed to the warm air inside the gear drive housing.

Tubes 20 can be removed and inserted from the exterior and all connections are made exterior of the gear drive housing. This facilitates servicing and maintenance of the heat exchanger. The use of external connections also prevents any water leakage at the connections from polluting the lubricant.

Although the invention has been described as involving the use of water as the coolant, other available coolants could also be used. Regardless, of the coolant used, the coolant could be passed through an external heat exchanger for reclaiming the heat. As an example, the coolant could be passed through a fan cooled radiator to heat a room or building.

What is claimed is:

1. In a gear drive that has meshing gearing mounted in an enclosure that provides a reservoir for a lubricant, a cooling system comprising:
   pairs of bushings received in corresponding pairs of aligned openings in opposite walls of said enclosure;
   a plurality of heat exchanger tubes each including a straight pipe and fins disposed about the pipe, the pipe of each tube extending at each end through a respective one of a pair of bushings;
   fittings mounted in said bushings exterior of the enclosure and each including first sealing means sealing the perimeter of the pipes to thereby seal the lubricant in the enclosure from the surrounding environment; and
   connections joining adjacent extending pipe ends exterior of the enclosure to form a continuous path of tubes, said connections each including second sealing means sealing the perimeters of the pipes to thereby seal a cooling fluid in the pipes from the surrounding environment.

2. A gear drive in accordance with claim 1 together with means for connecting one end of the path of tubes to a source of water under pressure and the other end of the path to a drain.

3. In a gear drive that has meshing gearing mounted in an enclosure that provides a reservoir for a lubricant, a cooling system comprising:
   pairs of bushings received in and sealed with corresponding pairs of aligned openings in opposite walls of said enclosure;
   a plurality of heat exchanger tubes each including an uninterrupted straight pipe and fins disposed about the pipe, the pipe of each tube extending at each end through a respective one of a pair of bushings;
   fittings mounted to said bushings exterior of the enclosure, said pipes extending through said fittings and said fittings sealing the exterior of said pipes to prevent leakage of the lubricant; and
   connections joining adjacent extending pipes at their ends exterior of the enclosure to form a continuous path of tubes, said connections being spaced along the pipes from said fittings remote from the enclosure and sealing the exterior of the pipes to prevent leakage of a cooling fluid in the pipes.

* * * * *